UNITED STATES PATENT OFFICE.

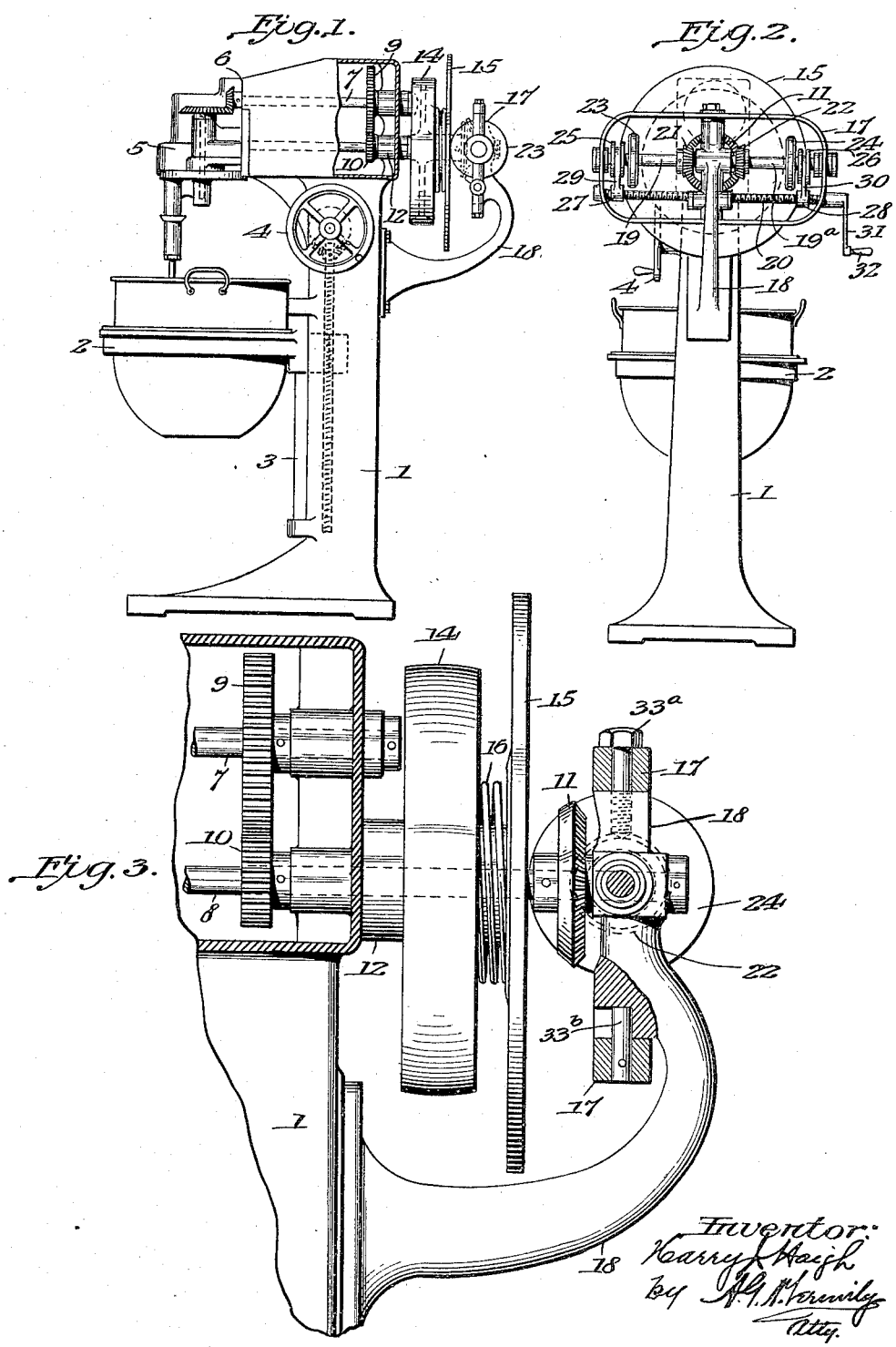

HARRY J. HAIGH, OF STAPLETON, NEW YORK.

MIXING-MACHINE.

1,219,730.

Specification of Letters Patent.

Patented Mar. 20, 1917.

Application filed July 7, 1914. Serial No. 849,420.

*To all whom it may concern:*

Be it known that I, HARRY J. HAIGH, a citizen of the United States of America, residing at Stapleton, Richmond county, New York, have invented certain new and useful Improvements in Mixing-Machines, of which the following is a specification.

My invention relates to a cake mixing machine, and it consists in a mixing machine provided with a plurality of friction gears driven from one other friction gear and transmitting power to a single shaft, and also in combining the same with a beater and a bowl moving mechanism.

In the mixing of many varieties of cake and some other materials, it is desirable to change the speed of the beater at an interval or intervals during the mixing and it is further desirable to be able to accomplish that change of speed without stopping the beater. Increased lightness and other advantages accrue from a mixing which is accomplished, as it is in this machine, without arresting the beater motion.

Figure 1, is a side view of a cake mixer embodying my invention, a part of the casing having been broken away to more clearly exhibit the interior.

Fig. 2, is a rear view of said machine.

Fig. 3 is a side view, on an enlarged scale, of that part of the machine embodying the friction gears, partly in section to show interior gears and to more clearly exhibit the construction which permits the frame, carrying the friction rollers, to oscillate in such manner as to provide for even pressure.

1, represents a standard adapted to support the instrumentalities assembled in this machine. 2, represents the bowl ring which together with the rods 3, on which the bowl ring slides, and a socket and screw, operated by hand wheel 4, constitute the bowl moving mechanism, but as such mechanism is well known, it needs no particular description. The same may be said of the planetary beater mechanism 5, located in the head 6, and operated by shafts 7 and 8, mounted in the head 6, and geared together by means of gear wheels 9 and 10, secured respectively to shafts 7 and 8 and meshing together. I do not limit myself to that form of bowl mover or to that form of beater mechanism.

But the mechanism by which motion is communicated to these shafts, in this instance to shaft 8, needs a more detailed explanation.

The shaft 8, extends through the casing of head 6 and is provided, outside of said head, with a bevel gear 11. One bearing in the head, is in the form of a bushing 12, and this bushing projects outwardly for such a distance as to provide a fixed shaft on which I mount a driving pulley 14, and a large friction disk 15, so secured together as to revolve in unison on their bushing shaft 12.

The hub of wheel 14, bears against a shoulder of bushing 12 and a spring 16, is interposed between the hub of pulley 14, and the proximate face of disk 16, to hold said disk firmly to its work. Then I provide a yoke 17, supported on an arm 18, extending from and secured to standard 1. In this yoke 17, and the arm 18, I mount shafts 19, 19$^a$, and a right and left handed feed-screw 20, shafts 19, 19$^a$, being provided with bevel gears 21, 22, meshing with gear 11, at different, here opposite, points, one on the left side and the other on the right side of said gear 11. Shafts 19, 19$^a$, each carries a friction roller 23, 24, splined to but slidable thereon, and their hubs are provided with collars 25, 26. Then on the feed screw 20, which is threaded for its length, I mount two sleeves 27, 28, also threaded to move on the threads of said feed screw 20, and provided with bifurcated arms 29, 30, which respectively engage the collars 25, 26, of the friction rollers 23, 24. A crank 31, secured to feed-screw 20, and provided with a handle 32, furnishes a convenient means for operating the changes of speed which may be desired. The yoke 17 is so supported as to be capable of an oscillatory movement. In this instance that result is accomplished by extending a pivot pin 33$^b$ from the lower member of frame 17. It is fastened to the frame so it will not drop out, and adapted to be inserted into and to rest in a recess in a boss or projecting portion of the arm 18, the form of the recess and that of the pivot pin being such as to permit the oscillation of the pin in the recess. Then I pass a pivot bolt 33$^a$ through the upper member of the frame 17, thus pivoting it at that point, threading said bolt 33$^a$ into the upwardly projecting end of arm 18, and turning the bolt down until it is rigid, but still permits the frame to turn upon it.

By arranging pin 33$^a$ and pin 33$^b$ with coincident vertical axes, an easy oscillation of the frame 17 is permitted, though it is at the same time firmly supported upon the arm 18.

The operation of this device is as follows:—

Power is communicated to pulley 14, in any suitable way, by belt or otherwise. When the pulley 14, turns, the disk 15, necessarily turns with it, for they are so secured as to partake of each other's rotary motion.

Friction disk 15, is held against friction rollers 23, 24, by the spring 16, and consequently they turn when the disk does. In doing so they communicate motion to the shafts 19, 19$^a$, and the bevel gears 21, 22, thereon, and the bevel gear 11, and its shaft 8, is thereby turned, the ultimate result sought.

It will be noticed that by means of the plurality of friction rollers and bevel gears, I get twice the power from friction disk 15, which I would secure with but one roller and one bevel wheel, and that though the rollers and bevel wheel on one side, turn in an opposite direction to those on the other side, both transmit a uniform motion to bevel gear 11, because gears 21, 22, engage on opposite sides of the axis of shaft 8.

It will also be noticed that the frame 17, may be oscillated on its double pivots 33$^a$, 33$^b$, consequently, if one roller should wear faster than the other, or the disk should not set at an absolute right angle to the faces of the rollers, the frame carrying the rollers becomes a draft equalizer and swings on its pivots so as to accommodate the situation, and balance the pressure on the respective sides of the shaft 8.

Now if I wish to decrease the speed of shaft 8, and thereby decrease the speed of the beater which is driven therefrom, I turn crank 31, and rotate the feed-screw 20, and the sleeves 27, 28, thereon will carry the arms 29, 30, inward and thus slide the friction rollers 23, 24, inward to contact with a lesser diameter of disk 15. Being on a lesser diameter, the rotation of the disk at the same speed as before, will drive the rollers, the bevel gears, the shaft 8, and the beater mechanism at a slower speed than before and this will have been done easily, quickly and without the necessity of stopping the beater.

A reverse turning of the crank 31, would of course increase the speed and the operator thus has at his command a range of all speeds from the lowest to the highest.

I have shown the invention as employing bevel gears in line and two friction rollers outside of the disk, but I do not limit myself to this arrangement, either of bevel gears or rollers. The central thought is a mixer provided with a plurality of friction devices driven from, preferably one, friction device and communicating motion, preferably through a plurality of gears, to one shaft or connecting device from which something else is to be driven, thus multiplying the power which can be transmitted from one moving item to another item through friction devices in a convenient way and without that severe pressure of one friction device upon another which would greatly reduce the power or the speed which could be transmitted.

What I claim as my invention and desire to secure by Letters-Patent, is:—

1. In a mixing machine, a standard, a bowl support, a beater mechanism provided with an operating shaft, a friction disk mounted on said shaft, a driving wheel also mounted on said shaft, and so secured to the driving wheel as to rotate with it, a gear secured to the shaft, a frame mounted on the standard and carrying a plurality of shafts provided with gears in mesh with the gear on the beater mechanism shaft and with a plurality of friction rollers engaging the face of the friction disk, together with means for synchronously shifting said friction rollers.

2. In a mixing machine, a standard, a bowl support, a beater mechanism provided with an operating shaft, a friction disk mounted on said sleeve, a driving wheel also mounted on said shaft, and so secured to the driving wheel as to rotate with it, a gear secured to the shaft, a frame mounted on the standard and carrying a plurality of shafts provided with gears in mesh with the gear on the beater mechanism shaft and with a plurality of friction rollers engaging the face of the friction disk, together with means for synchronously shifting said friction rollers, and a spring set substantially as described whereby its tension will press the friction disk and rollers together.

3. In a mixing machine, a beater mechanism and a friction power transmitter composed of a friction wheel, a plurality of friction rollers mounted in a rockable frame, said rollers being geared to the shaft of the beater mechanism and adjusted to engage the face of said friction wheel, all substantially as set forth.

4. In a mixing machine, a standard, a bowl support, a beater mechanism provided with an operating shaft, a sleeve surrounding said shaft, a friction disk mounted on said sleeve, a driving wheel also mounted on said sleeve, a gear secured to the shaft, a frame mounted on the standard and carrying a plurality of shafts provided with gears in mesh with the gear on the beater mechanism shaft and with a plurality of friction rollers engaging the face of the friction disk, together with a feed screw, arms sleeved on the feed screw and engaging respectively the friction rollers and means for operating said feed screw substantially as set forth whereby the radial distance from the axis of the disk to the feed rollers may be varied.

In testimony whereof, I have signed my name to this specification in the presence of two subscribing witnesses, this 30th day of June, 1914.

HARRY J. HAIGH.

Witnesses:
  IRVING S. BODKIN,
  BEN POSNER.

Copies of this patent may be obtained for five cents each, by addressing the "Commissioner of Patents, Washington, D. C."